Nov. 15, 1955  W. N. KILNER  2,724,064
CONSTRUCTION OF DYNAMO ELECTRIC MACHINES
Filed Jan. 14, 1953  2 Sheets-Sheet 1
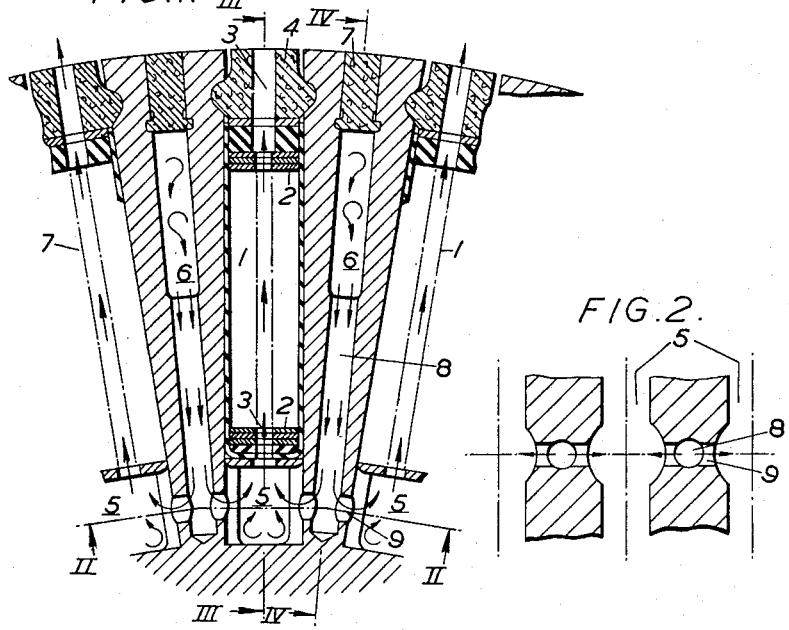
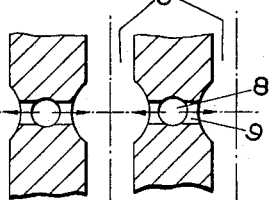
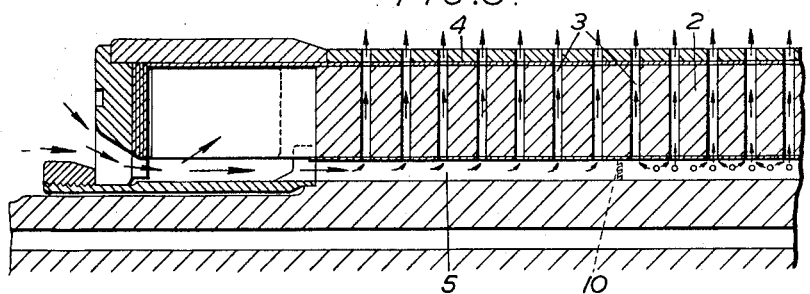
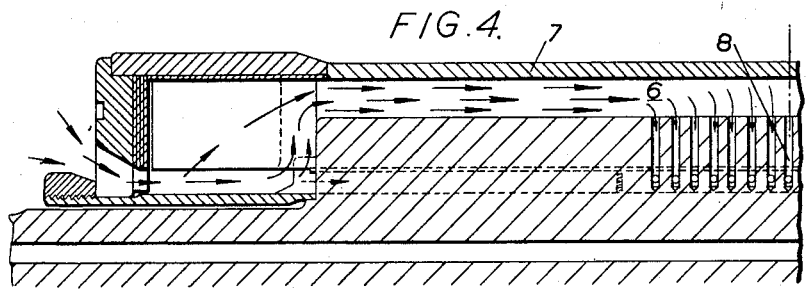
Inventor
William Norman Kilner
By
Attorneys Nov. 15, 1955  W. N. KILNER  2,724,064
CONSTRUCTION OF DYNAMO ELECTRIC MACHINES
Filed Jan. 14, 1953  2 Sheets-Sheet 2
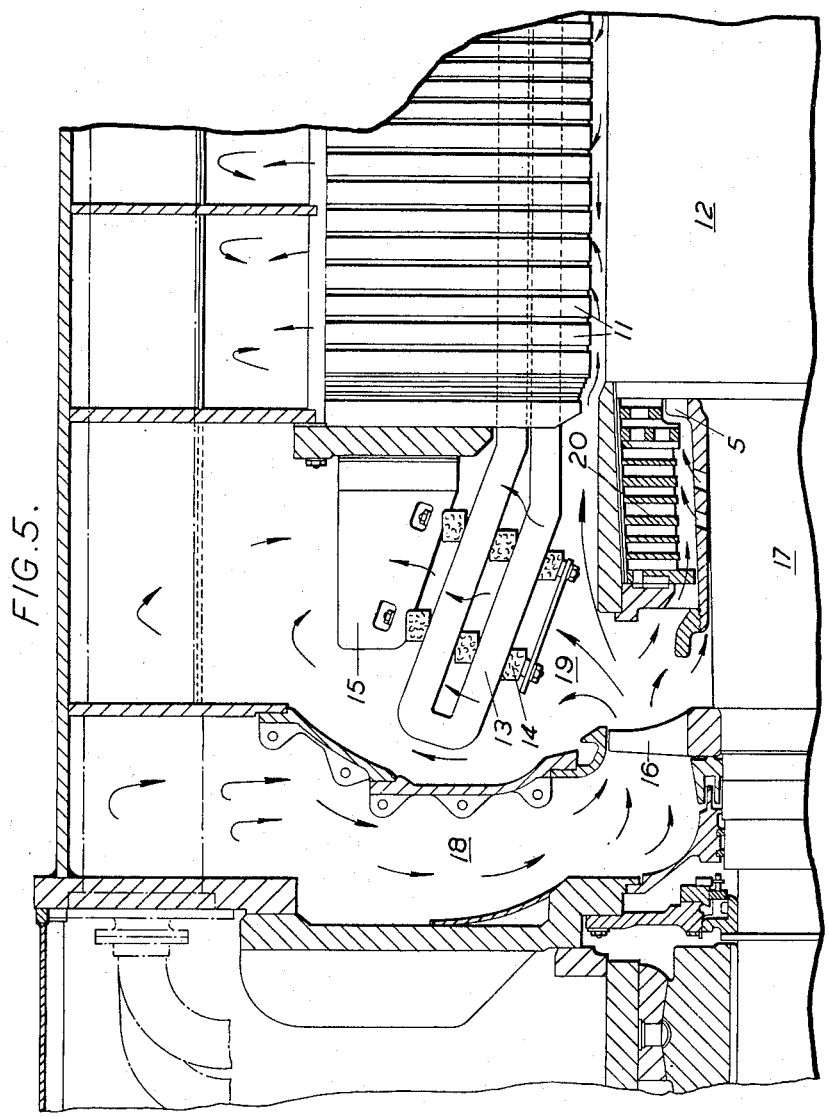
Inventor
William Norman Kilner
By Harris & Bateman
Attorneys.

United States Patent Office 2,724,064
Patented Nov. 15, 1955

2,724,064

CONSTRUCTION OF DYNAMO ELECTRIC MACHINES

William Norman Kilner, Hale, England, assignor to Metropolitan-Vickers Electrical Company Limited, London, England, a company of Great Britain Application January 14, 1953, Serial No. 331,209

Claims priority, application Great Britain February 11, 1952

2 Claims. (Cl. 310—61)

This invention relates to dynamo electric machines, and has an important application in turbo-alternators. The invention is concerned with improved cooling of the windings embedded in the rotor.

For this purpose it is known to circulate cooling gases axially through the rotor, either in sub-slots, that is recesses extending axially below the base of the main, or winding slots, or in axially extending slots formed in the pole teeth intermediate each winding slot. In such arrangements it is also known to allow the cooling gases to pass from the slots radially into the air gap between the rotor and the stator either from the sub-slots through substantially radial holes formed in the teeth or from the tooth slots through holes formed in the wedges which close the tops of these slots.

According to the present invention, the method of cooling the embedded windings of the rotor consists in causing a flow of cooling gases radially outwards from sub-slots below the conductor slots through the winding slots and past the conductors therein to the air gap, the supply of cooling gases to the sub-slots being effected in part by feeding gases directly into the ends of the sub-slots and in part by feeding gases directly into the ends of axially extending tooth slots in the adjacent teeth, and thence into the sub-slots along the mid part (axially) of the rotor.

This invention also comprises a dynamo electric machine in which the rotor core has gas cooling passages including sub-slots extending axially below the winding slots and radial passages between the sub-slots and rotor face extending through the winding slots and tooth slots extending axially within the rotor teeth and communicating passages between the tooth slots and the adjacent sub-slot or slots, at least along the mid part (axially) of the rotor, together with means whereby gas is fed directly into the ends of the sub-slots and additional gas is fed into the ends of the tooth slots and thence into the sub-slots.

The cooling fluid may be air or other gas such as hydrogen.

Preferably the gases flowing through the main winding slots are passed through passages formed by perforating the stack of conductors in the slots so that the cooling gases flow directly past the conductors.

One form of the invention is illustrated in the accompanying drawing, in which:

Fig. 1 is a part section of a rotor taken on a plane normal to the axis,

Fig. 2 is a section on the line II—II of Fig. 1,

Figs. 3 and 4 show on a smaller scale half axial sections of part of the rotor taken on the lines III—III and IV—IV respectively of Fig. 1, and Fig. 5 is a longitudinal section of a machine showing the ends of the rotor and stator windings.

In the construction shown, the main or winding slots 1 of the rotor contain strap-like conductors 2 which are arranged and insulated in conventional manner. The stack of conductors in each slot is, however, formed with a succession of radial perforations and corresponding perforations are formed through the insulation and through the slot wedges 4 so that there exist radial discharge passages 3 leading from the sub-slots 5 to the periphery of the rotor through which cooling gases may flow. As shown more clearly in Fig. 3, such gases are introduced in an axial direction at the ends of the rotor and flow along the sub-slots 5 and thence radially outwards through the above-mentioned channels 3. In such an arrangement the supply of cooling gases is liable to be deficient in the central portion of the rotor since it is not in general practicable to form the sub-slots of a size which is sufficient to pass the total required volume of gases. Accordingly an additional supply of gas is introduced into the ventilating or tooth slots 6 at the ends of the rotor. Over the central section of the rotor, for example, the central third portion of the rotor, holes 8 are formed at intervals along the length of the tooth slots which extend radially inwards from the bottom of these slots toward the base of the sub-slots 5, and connecting passages 9 are formed therebetween. The outer ends of the tooth slots are closed by a slot wedge 7.

With this arrangement, over the middle portion of the rotor and as shown more clearly in Fig. 4, cooling gases pass axially inwards along the tooth slots 6, through the holes 8 and passages 9 to the sub-slots 5 from which they flow radially outwards through the channels 3. If desired the central portion of the rotor may be cooled entirely by gases which are fed through the tooth slots, and the sub-slots may be divided by suitably positioned barriers 10 (Fig. 3) if it is desired to separate the two streams of cooling gas.

The arrangement of the invention enables a considerable increase in volume of cooling gas to be provided and since all the cooling gases pass ultimately through the winding slots and in close contact with the conductors therein, very efficient cooling may be obtained.

Instead of passing the cooling gases directly through a perforation formed in the conductors, these conductors may be suitably arranged in the slots so that the gases may flow round them, for example, the width of the conductors may be less than the width of the slot cell so that a space may be left on either side of the conductors through which the gases may flow.

The supply of cooling gases to the rotor may be effected in any convenient manner, for example, by providing a fan or fans on the rotor shaft adjacent the ends of the rotor.

In Fig. 5 the reference 11 indicates the stator core whilst 12 is the rotor (shown in outside elevation). The end turns of the stator winding are indicated by the reference 13, these end turns being separated by bracing rings 14 and being clamped against an insulating bracket 15 in accordance with well-known practice. A fan 16 is mounted on the rotor shaft 17 and draws air through the inlet passage 18 to the chamber 19 in which a gas pressure will be set up; this will force gas along the passage below the end turns 20 of the rotor winding into the ends of the sub-slots 5 which will pass along the sub-slots and out through the radial discharge passages 3 (Figs. 1–3). At the same time gas from the pressure chamber 19 will pass along the duct 6, which is shown in Figs. 1 and 4 but does not appear in Fig. 5, and will pass through the passages 8 to the sub-slots 5.

In the case of hydrogen cooling the gas will, of course, be recirculated after cooling. In the case of air cooling, however, it may be discharged to the atmosphere.

What I claim is:

1. A dynamo electric machine including a stator and a rotor having a toothed core and slots, a winding including conductors arranged in the slots in the rotor core, toothed portions of the rotor core being between adjacent slots, ducts for cooling gas extending axially along the rotor core beneath said slots, cooling gas discharge passages through the conductors in said slots extending radially between said axial ducts and the peripheral face of the rotor, supplementary ducts through said rotor tooth portions extending downwards to the depth of said axial ducts, communicating ports extending circumferentially between said supplementary ducts and said axial ducts, and means for feeding cooling gas from at least one end of the rotor into both said axial ducts and said supplementary ducts, said cooling gas in said supplementary ducts being conducted downwards into communicating ports and thence to said axial ducts to augment the cooling gas therein.

2. In a dynamo electric machine, a rotor having a toothed core with slots and a winding therein, said winding comprising a plurality of metal straps superimposed in the slots in the core, ducts extending axially through the core beneath said slots, discharge passages extending radially from said axial ducts through said metal straps to the rotor peripheral face, supplementary ducts in the core teeth extending downwards to the depth of said axial ducts, communicating ports along the mid-part of the rotor extending circumferentially between said supplementary ducts and the adjacent axial ducts, and axial wedge members closing said supplementary ducts for ensuring flow of cooling gas therein into said communicating ports and thence to said axial ducts.

References Cited in the file of this patent

UNITED STATES PATENTS

| 1,178,771 | Zehrung | Apr. 11, 1916 |
| 1,913,264 | Cornu | June 6, 1933 |
| 1,985,040 | Laffoon | Dec. 18, 1934 |
| 2,043,120 | Punga | June 2, 1936 |
| 2,459,586 | Ross | Jan. 18, 1949 |

FOREIGN PATENTS

| 49,943 | France | June 6, 1939 |
| 691,191 | Germany | May 25, 1940 |
| 714,319 | France | Sept. 1, 1931 |